United States Patent Office 3,597,436
Patented Aug. 3, 1971

3,597,436
8,9 DEHYDRO-13-AZA ESTRONES
Henderikus Obias Huisman, de Savornin Lohmanlaan 20, and Willem Nico Speckamp, Fideliolaan 79, both of Amstelveen, Netherlands
No Drawing. Filed Mar. 5, 1969, Ser. No. 804,705
Int. Cl. C07d 101/00
U.S. Cl. 260—289AZ
2 Claims

ABSTRACT OF THE DISCLOSURE

The specification discloses the 3-methyl ether of 8,9-dehydro-13-aza-estrone having the formula

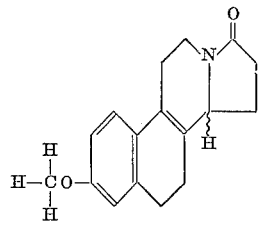

which is useful as an antifertility agent in mammals and methods and intermediates for synthesizing that compound. Such intermediates include N[2-(6-methoxy-1,2,3,4-tetrahydronaphthylidine)-ethyl]succinimide and 1-carbomethoxy-3,3-bis-benzylcarbamatepropane.

BACKGROUND OF THE INVENTION

This invention relates to a novel steroid compound having utility as an antifertility agent and to valuable intermediates in the preparation of the new steroid compound.

There is a significant need for the development of new contraceptive agents, particularly agents for oral administration which are effective in preventing or reducing the incidence of conception and which are relatively free of the side effects often associated with known contraceptive agents. Such contraceptive agents are considered to be of great value in population control, not only with respect to man but also with respect to mammals, e.g., mice, rats, rabbits, and the like.

Therefore, it is an object of this invention to provide a new steroid contraceptive agent which is useful in preventing or reducing pregnancies in treated subjects.

A further object of the invention is to provide a steroid contraceptive agent which can be administered orally.

A further object of the invention is to provide a steroid contraceptive agent which is characterized by low estrogenic activity and low androgenic activity.

A still further object of the invention is the provision of methods for preparing the contraceptive agent disclosed herein.

This invention is directed to nitrogen-containing 3-methoxy-17-keto steroids and particularly to the compound 8,9-dehydro-13-aza-estrone methyl ether which has been found to have utility as a contraceptive agent in mammals. The compound can be administered orally or parenterally, and is, therefore, a valuable pharmaceutical material which is available to inhibit conception. Such compounds are of significant value in controlling mammalian, e.g., rodent, populations. The invention also includes the α and β configurations as well as mixtures of both the α and β forms. A preferred embodiment is the 14α isomer of the steroid compound.

Also within the contemplation of the invention are methods for preparing the above-named steroid which employ N[2-(6-methoxy-1,2,3,4-tetrahydronaphthylidine) ethyl]succinimide and 1-carbomethoxy-3,3-bis-benzylcarbamatepropane as novel intermediates.

Since the steroid compound of the invention contains an asymmetric carbon atom at the 14-position, the steroid compounds of the invention can be described as and include the d and l forms as well as racemic mixtures thereof.

This compound is of particular interest as an anti-fertility agent because it exhibits an unusually low level of the side effects frequently associated with steroids. For example, when tested in mice the compound exhibited low estrogenic activity and virtually no androgenic activity.

The estrogenic activity was evaluated in tests conducted on spayed female mice. Ten days after removal of the ovaries treatment with the test compound was initiated at a dosage level of 10 milligrams per kilogram of body weight, per os. Dosing was conducted daily for seven days and the animals were sacrificed on the eighth day and examined vaginally for estrogenic indicia. Estradiol was used as a standard, and the test results were compared with suitable control animals which did not receive the test compound. A relative measure of estrogenic activity was calculated in terms of the ratio of the average uterine weight of the treated animals over the average uterine weight of the control animals. The results of these tests indicate an unusually low degree of estrogenic activity.

The contraceptive characteristic of the compound was established by tests in which the compound was administered daily, per os, to mature female mice on a six dose schedule, a single dose being given three days before mating and a single dose each day for five days during mating. The test animals were sacrificed on the eleventh day following mating and their uteri examined for implantation sites. The absence of implantation sites indicates complete inhibition of pregnancy. Complete inhibition was achieved at a dosage level of about 50 milligrams per kilogram of body weight and a significant reduction in pregnancy was achieved at a dose level as low as 20 milligrams per kilogram.

The compound of this invention can be administered orally or parenterally, e.g., subcutaneously, in the usual dosage forms. The active compound can be formulated with well-known pharmaceutically acceptable carriers, diluents, flavoring agents, and the like for administration in the form of tablets, capsules, powders, granules, suspensions, solutions, and the like.

The compound d,l-8,9-dehydro-13-aza-estrone methyl ether can be prepared by two methods as illustrated in reaction schemes A and B, below.

In carrying out the process of the invention, the compound of this invention or other similar compounds can be prepared by condensing a suitable vinyl alcohol with a nitrogen-containing function, such as an imide, under conditions of basic catalysis, followed by catalytic dehydration in the presence of a Lewis acid, e.g., phosphorus oxychloride, or the like, and subsequent reduction to give the desired reaction product for extraction and purification. For example, d,l-8,9-dehydro-13-aza-estrone can be prepared from N[2 - (6 - methoxy-1,2,3,4 - tetrahydronaphthylidine)ethyl]succinimide by catalytic dehydration in the presence of a Lewis acid followed by catalytic hydrogenation. The starting material can be conveniently prepared by condensing 1-hydroxy-1-vinyl-6-methoxy-1,2,3,4-tetrahydronaphthalene with succinimide.

Alternatively, such compounds can be prepared by catalytic condensation of an appropriate cyclic diene with a suitable dicarbamoyl compound in the presence of a Lewis acid, e.g., boron trifluoride-etherate, followed by isomerization via treatment with a mild acid-organic solvent mixture in the presence of alumina. Ring closure to give structure III can be achieved via removal of benzyl alcohol functions, and followed by hydrolysis of the resulting carbomethoxy group and decarboxylation.

Where necessary, the reactions can be carried out in the presence of organic solvents which are inert under the reaction conditions and which will not interfere with the desired reaction. Intermediate reaction products can be employed with or without recovery as conditions require. Such intermediates can be recovered in any conventional manner, e.g., by extraction, drying, and crystallization.

Reaction Scheme A

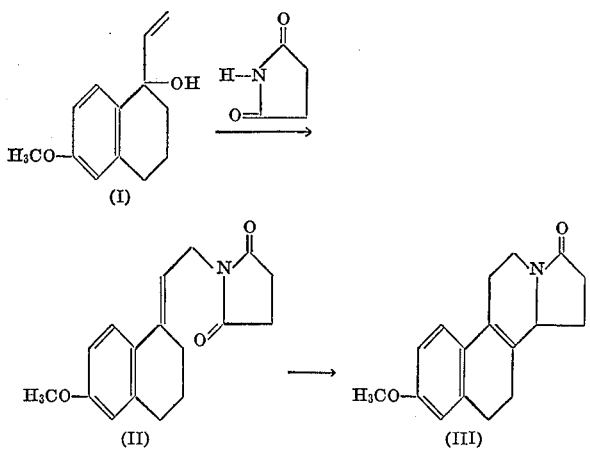

Reaction Scheme B

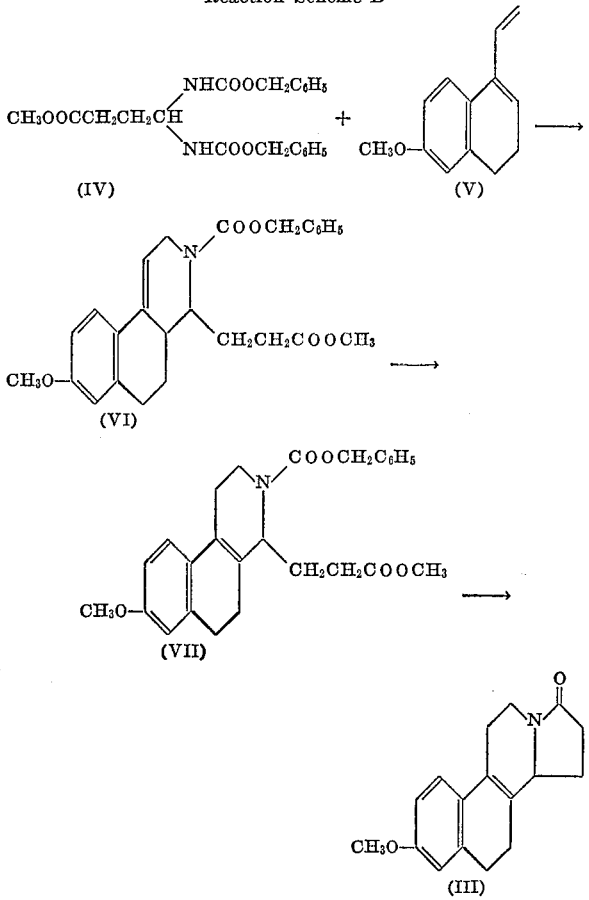

Examples 1 and 2, below, describe a specific embodiment of reaction scheme A, and Examples 3 and 4 describe a specific embodiment of reaction scheme B.

EXAMPLE 1

N[2-(6 - methoxy - 1,2,3,4 - tetrahydronaphthylidene) ethyl]succinimide (II): In a round-bottomed flask, placed in an oil bath with a temperature of 140° C., a melt is made of succinimide and potassium succinimide (M.P. 256° C.) with a ratio of 13.1 equivalents succinimide to 4.75 equivalents potassium succinimide. With stirring 6.2 equivalents of 1-hydroxy-1-vinyl-6-methoxy-1,2,3,4-tetrahydronaphthalene (I) are rapidly added and the resulting admixture is well stirred for seven hours, while the temperature of the oil bath is maintained at 140° C. The mixture is allowed to cool to room temperature, after which it is shaken with ether and a 5% potassium hydroxide solution. The mixture is transferred to a separatory funnel and the ether layer is removed. The aqueous layer is extracted with three portions of ether and the ether extracts are combined. The combined ethereal extracts are washed with water and with a saturated sodium chloride solution and dried with anhydrous magnesium sulphate. After drying the ether is removed by distillation and the remaining brown oil is dissolved in acetone. The brown colored solution is filtered and the acetone is removed by distillation under reduced pressure. The remaining brown colored oil is subjected to column chromatography. The absorbent used consists of aluminium oxide and a mixture of cyclohexane and ethylacetate (volume ratio 9:1) is used as an eluent. N[2-(6-methoxy-1,2,3,4-tetrahydronaphthylidene)ethyl]succinimide (II) is obtained as a brown solid. Recrystallization from ethanol gives the product as white crystals having a melting point of 118°–120° C. at a yield of about 20%–30%.

IR (KBr): 1770 and 1700 cm.$^{-1}$ (C=O); NMR (CDCl$_3$): δ 1.85 multiplet (C$_3$—CH$_2$), 2.61 singlet (CO—CH$_2$—CH$_2$—CO), 2.66 multiplet (C$_2$ and C$_4$—CH$_2$)

3.77 singlet (OCH$_3$), 4.23 doublet (N—CH$_2$), 5.88 triplet (=CH) and 6.5–7.5 (aromatic protons).

The recovered product gave a correct elementary analysis.

EXAMPLE 2

8,9-dehydro-13-aza-estrone methyl ether (III): In a round-bottomed flask, placed in a water bath at a temperature of 50°–60° C., a mixture consisting of 1.0 g. of N[2-(6-methoxy-1,2,3,4 - tetrahydronaphthylidene)ethyl] succinimide (II), 7.0 milliliters of freshly distilled phosphorus oxychloride, 0.3 milliliter of water, and 10.0 milliliters of benzene is stirred for six hours. The benzene and phosphorus oxychloride are removed by distillation under reduced pressure and the remaining material is dissolved in 40 milliliters of anhydrous acetic acid. Two hundred and fifty milligrams of rhodium on aluminium oxide are added to the solution and the mixture is hydrogenated in a Parr apparatus at room temperature with a hydrogen pressure of 2–4 atmosphere for 15 to 20 hours. Acetic acid is removed by distillation under reduced pressure and the remaining material is treated with a mixture of chloroform and 5% solution of potassium hydroxide in a separatory funnel. The chloroform layer is washed with water and a saturated solution of sodium chloride, after which it is dried with anhydrous magnesium sulphate. The solution is filtered and the chloroform is removed by distillation under reduced pressure. The remaining oil crystallizes on treatment with ethyl acetate. Recrystallization from petroleum ether (B.P. 40° to 60° C.) and ethanol gives d,l-8,9-dehydro-13-aza-estrone methyl ether (III) as light green crystals having a melting point of 125°–127° C., at a yield of about 80%.

IR (KBr) 1660 cm.$^{-1}$ (C=O); UV (EtOH) λ$_{max}$ 216 (18.000) and 274 (13.000) nm; NMR (CDCl$_3$) δ 2.0–3.3 multiplet (11 protons), 3.77 singlet (OCH$_3$), 4.0–4.6 multiplet (N—CH), 6.5–7.2 (aromatic protons). A mass spectrum showed the molecular ion peak at m/e 269.

The recovered product gave a correct elementary analysis.

EXAMPLE 3

1 - carbomethoxy - 3,3 - bis - benzylcarbamate-propane (IV): A mixture of 48 grams of β-carbomethoxy-propionaldehyde, 124 grams of benzyl carbamate and 0.73 milliliter of boron trifluoride-etherate in one liter of benzene was refluxed for one hour. The resulting solution was cooled in ice water and allowed to stand for one day after which the precipitate was filtered to yield 99.2 grams of 1-carbomethoxy-3,3-bis-benzylcarbamate-propane having a melting point of 126° to 130° C. Recrystallization from benzene gave a product having a melting point of 137°–138° C.

A solution of 10.11 grams of the diene shown by V in 135 milliliters of benzene was added, over a 30-minute period, to a solution of 1-carbomethoxy-3,3-bis-benzylcarbamate-propane and 0.55 milliliter of boron trifluoride-etherate in 600 milliliters of benzene at a temperature of about 70° C. After stirring the resulting admixture for two hours, the benzene was evaporated, the residue dissolved in ether and the ether solution washed with water until the pH of the washings was neutral. The ether solution was dried with MgSO₄. After evaporation of the ether, the residue was dissolved in a minimum amount of benzene and 4.47 grams of benzyl carbamate crystallized. The benzene was evaporated from the remaining solution and the residue chromatographed (EtOAc-cyclohexane 1:9) on alumina to provide 11.26 grams of methyl-2,4'-[N-carbobenzoxy-8'-methoxy - 2',3',4',4a',5',6' - hexahydrobenzo[f]isochinolinyl]propionate (VI) as an oil. Crystallization from ether gave a material having a melting point of 99° to 105° C. and a correct elementary analysis.

Methyl - 2,4'[N - carbobenzoxy-8'-methoxy-2',3',4',4a', 5',6' - hexahydrobenzo[f]isochinolinyl]propionate (VI) was isomerized to methyl-2,4'[N-carbobenzoxy-8'-methoxy - 1',2',3',4',5',6' - hexahydrobenzo[f]isochinolinyl] propionate VII by treatment with ethyl acetate-acetic acid over alumina for 48 hours to give a product having a melting point of 79°–81° C. after crystallization from ether, at a yield of about 70% to 80%.

EXAMPLE 4

8,9-dehydro-13-aza-estrone methyl ether (III): 1.427 grams of methyl-2,4'[N-carbobenzoxy-8'-methoxy-1',2',3', 4',5',6' - hexahydrobenzo[f]isochinolinyl]propionate VII was dissolved in a mixture of 6 milliliters of ether and 1.5 milliliters of HBr-acetic acid (370 g./l.). After standing at room temperature for 50 minutes, 10 milliliters of ether were added and the HBr-layer separated and extracted with ethyl acetate. After neutralization with aqueous sodium carbonate, the solution was extracted with ethyl acetate to give, after washing with water and drying over MgSO₄, 0.251 gram of an oil. The oil was refluxed in xylene for 45 minutes. After evaporation of the solvent, the residue was crystallized from EtOAc-cyclohexane (1:1) to yield 0.086 gram of the methyl ether of d,l-8,9-dehydro-13-aza-estrone having a melting point of 125° to 127° C. An additional crop of 0.066 gram was obtained via chromatography of the mother liquor over alumina and elution with ethyl acetate-cyclohexane (1:1).

The recovered product showed the same characteristics described for d,l-8,9-dehydro-13-aza-estrone methyl ether, obtained by Examples 1 and 2, above.

The steroid compounds of this invention can be administered orally to mammals, including humans, in an amount which is effective to inhibit pregnancy. An effective amount is one which will prevent or reduce the incidence of pregnancy in the subject. Generally, an effective amount will be a daily dose in the range of from about 0.1 to about 200 milligrams per kilogram of body weight.

We claim:
1. 8,9-dehydro-13-aza-estrone methyl ether having the formula

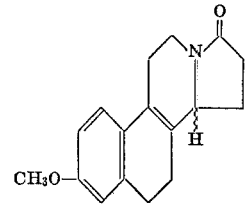

2. The 14-α isomer of the compound of claim 1.

References Cited

UNITED STATES PATENTS 3,476,755   11/1969   Taylor et al. _____ 260—289X
3,501,481   3/1970   Archibald _____ 260—289

FOREIGN PATENTS 1,017,700   1/1966   Great Britain _____ 260—289

OTHER REFERENCES

Schleigh et al.: Jour. Hetero. Chem., vol. 2, pp. 379–84 (1965).

DONALD G. DAUS, Primary Examiner

U.S. Cl. X.R.

260—240R, 287R, 326.5FM, 482B, 612R; 424—258